(12) United States Patent
Lee et al.

(10) Patent No.: US 7,591,443 B2
(45) Date of Patent: Sep. 22, 2009

(54) STAND OF A DISPLAY DEVICE

(75) Inventors: Moon Hee Lee, Goomi-si (KR); Jong Man Park, Daegu-si (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 11/493,002

(22) Filed: Jul. 26, 2006

(65) Prior Publication Data

US 2007/0108359 A1  May 17, 2007

(30) Foreign Application Priority Data

Nov. 14, 2005  (KR) ...................... 10-2005-0108670

(51) Int. Cl.
*F16M 13/00* (2006.01)
(52) U.S. Cl. .................... 248/158; 248/917; 361/600
(58) Field of Classification Search ............... 248/917, 248/919–923, 130, 158, 121, 124.1, 125.7, 248/284.1, 286.1, 291.1, 292.13; 361/682; 345/154, 204–206; 108/88, 150; 229/100
See application file for complete search history.

(56) References Cited

U.S. PATENT DOCUMENTS

| | | | |
|---|---|---|---|
| 4,881,707 A * | 11/1989 | Garfinkle | 248/222.12 |
| 6,772,983 B1 * | 8/2004 | Liao et al. | 248/291.1 |
| 7,177,144 B2 * | 2/2007 | Ha et al. | 361/681 |
| 7,232,098 B2 * | 6/2007 | Rawlings et al. | 248/121 |
| 2004/0084588 A1 * | 5/2004 | Liu et al. | 248/291.1 |
| 2005/0002156 A1 * | 1/2005 | Hsu et al. | 361/681 |
| 2005/0103797 A1 * | 5/2005 | Rader et al. | 220/844 |
| 2006/0101772 A1 * | 5/2006 | Suzuki | 52/646 |
| 2006/0133016 A1 * | 6/2006 | North et al. | 361/681 |
| 2007/0097610 A1 * | 5/2007 | Lee | 361/681 |

FOREIGN PATENT DOCUMENTS

KR  10-2002-0027798  4/2002

* cited by examiner

*Primary Examiner*—J. Allen Shriver, II
*Assistant Examiner*—Erin Smith
(74) *Attorney, Agent, or Firm*—Ked & Associates LLP

(57) ABSTRACT

A stand of display device is provided. The stand of a display device includes a hinge assembly to which a display device is pivotally coupled, a hinge body supporting unit to which the hinge assembly is detachably coupled, and a base unit detachably coupled to the hinge body supporting unit to support the display device on a supporting surface. Accordingly, the display device is made with a relatively small number of parts, and the manufacturing cost can be reduced. And the distribution cast can be reduced.

17 Claims, 10 Drawing Sheets

STAND OF A DISPLAY DEVICE

BACKGROUND OF THE INVENTION

1. Field of the Invention

The present invention relates to a stand of a display device, and more particularly, to a stand of a display device that can take up a relatively small space when it is packaged and be easily assembled and disassembled so that it can be packaged in a state where parts thereof are disassembled.

2. Description of the Related Art

Generally, a stand of a display device is a device for supporting a display device on a horizontal surface. The stand of a display device includes a supporting unit coupled to a rear surface of the display device and a base unit connected to a lower portion of the supporting unit and disposed on the horizontal surface.

The supporting unit coupled to the rear surface of the display device is designed to rotate, tilt, raise, and lower the display device. To realize this, the supporting unit has a hinge assembly on which the display device is coupled.

That is, the hinge assembly includes a first bracket fixed on the rear surface of the display device, a second bracket fixed on the supporting unit, a hinge shaft coupled between the first and second brackets, and a screw fixing the hinge shaft to the first and second brackets. The first and second brackets are formed of metal.

As described above, since the brackets and the hinge shaft are assembled by the screw, they may be separated when the screw is loosened by external impact.

In addition, since the supporting unit has a relatively large number of parts, the structure thereof is complicated, thereby increasing the manufacturing cost.

Furthermore, since there is a separated member for enclosing the hinge unit, the manufacturing cost and part number further increases.

When the stand is packaged, the supporting unit and the base unit are packed in a state where the two units are separated. At this point, since the supporting unit is still fixed on the display device, it is difficult to effectively use the space for package, thereby increasing the distribution cost.

SUMMARY OF THE INVENTION

Accordingly, the present invention is directed to a stand of a display device that substantially obviates one or more problems due to limitations and disadvantages of the related art.

An object of the present invention is to provide a stand of a display device having a hinge assembly composed of a relatively small number of parts.

Another object of the present invention is to provide a stand of a display device having a hinge assembly that is not required to be enclosed by a separated part, thereby reducing the number of parts.

Still another object of the present invention is to provide a stand of a display device that can packaged in a state where parts thereof are separated, thereby making it possible to effectively use a packaging space and thus reducing the distribution costs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand of a display device including: a hinge assembly to which a display device is pivotally coupled; a hinge body supporting unit to which the hinge assembly is detachably coupled; and a base unit detachably coupled to the hinge body supporting unit to support the display device on a horizontal supporting surface.

In another aspect of the present invention, there is provided a stand of a display device including: a hinge cover assembly coupled to a display device; a hinge shaft having a first side fixed to the hinge cover assembly; a hinge body having a hinge shaft receiving portion in which a second side of the hinge shaft is inserted; a hinge body supporting unit in which the hinge body is fitted; and a base unit in which the hinge body supporting unit is fitted.

In still another aspect of the present invention, there is provided a stand of a display device including: a hinge cover assembly coupled to a rear surface of a display device; a hinge shaft having a first side fixed to the hinge cover assembly; a metal hinge shaft having a first portion supported on the hinge cover assembly; a hinge body on which a second side of the hinge shaft is supported; a hinge body supporting unit to which a lower portion of the hinge body is coupled; and a base unit disposed on a horizontal surface and coupled to the hinge body supporting unit to support the display device against the horizontal surface, wherein at least one of the hinge cover, the hinge body, the hinge body supporting unit, and the base unit is formed of a plastic material.

According to the present invention, since the stand of a display device is made with a relatively small number of parts, the manufacturing cost can be reduced.

Since the hinge cover, the hinge body, the hinge body supporting unit, and the base unit can be assembled without using any separated fastening member such as screws, the assembling process can be simplified.

The hinge body supporting unit and the base unit can be easily disassembled from the hinge body fixed on the rear surface of the display device. Therefore, the parts of the stand can be independently separated, the packaging volume can be reduced. Furthermore, the separated parts can be easily assembled.

Since the hinge cover exposed out of the rear surface is coupled to the hinge shaft, there is no need to provide a cover portion enclosing the hinge portion, thereby reducing the number of parts.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
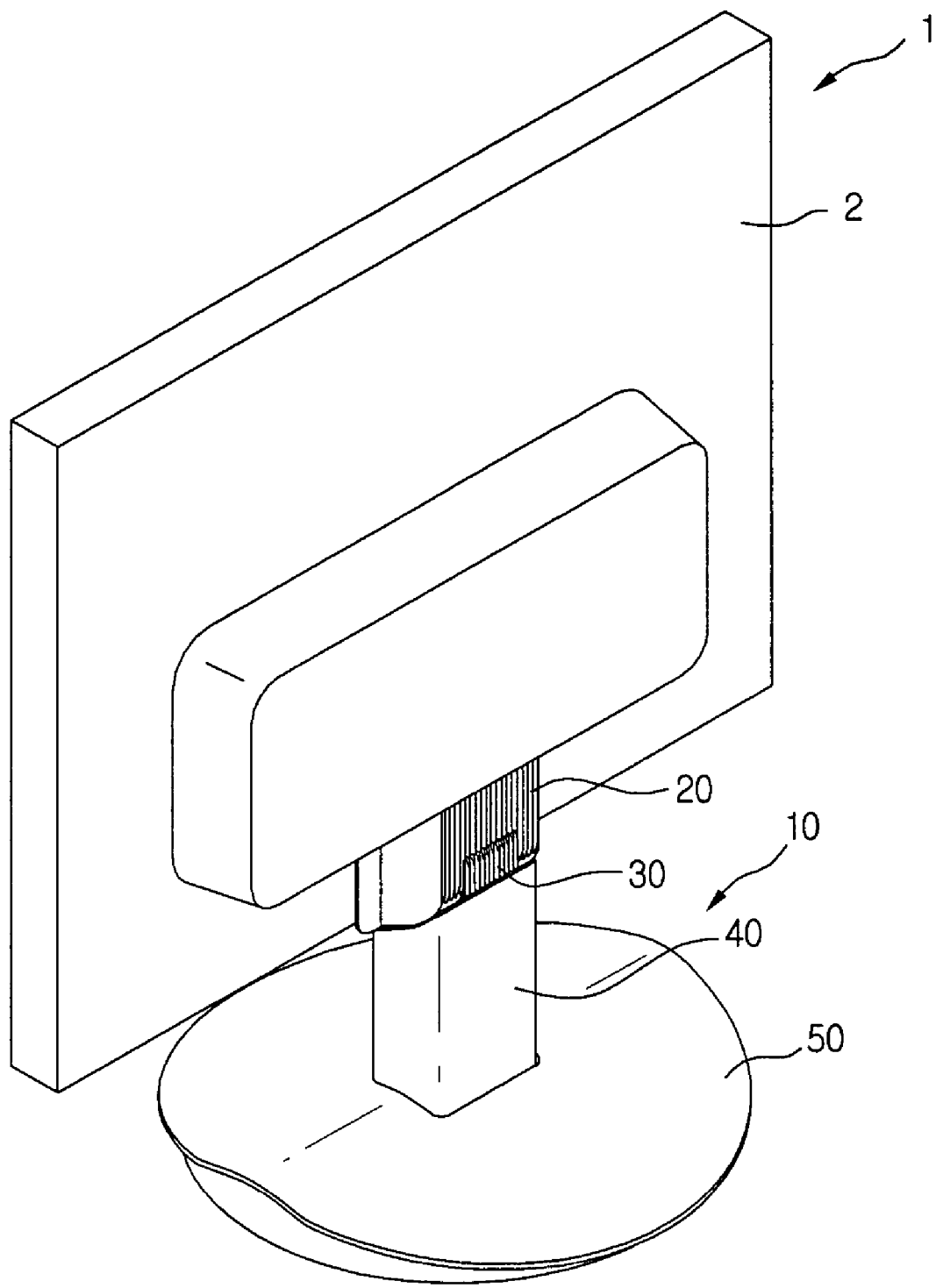
FIG. 1 is a rear perspective view of a stand of a display device according to an embodiment of the present invention.

FIG. 1 is a rear perspective view of a stand of a display device according to an embodiment of the present invention.

Referring to FIG. 1, a stand (10) of a display device of this embodiment includes a hinge cover assembly 20 fixed on a rear surface 2 of a display device 1, a hinge body 30 for rotatably supporting the hinge cover assembly 20, a hinge body supporting unit 40 for supporting the hinge body 30, and a base unit 50 placed on a bottom surface and connected to a lower end of the hinge body supporting unit 40.

The hinge cover assembly 20 is formed to pivot the hinge body 30 about a pivot axis and tilt the display device 1 up and down.

The hinge cover assembly 20, the hinge body 30, the hinge body supporting unit 40 and the base 50 of the stand (10) are preferably formed of plastic so that they can be easily manufactured and the manufacturing cost can be reduced.

A hinge shaft assembly 21 is provided to pivotally connect the hinge cover assembly 20 to the hinge body 30. That is, the hinge shaft assembly 21 allows the hinge cover assembly 20 and the hinge body 30 to pivot relative to each other. The hinge shaft assembly 21, the hinge cover assembly 20 and the hinge body are name as a hinge assembly.

Meanwhile, the hinge body supporting unit 40 can be separated from the hinge body 30 and base portion 50.

Figure 2:
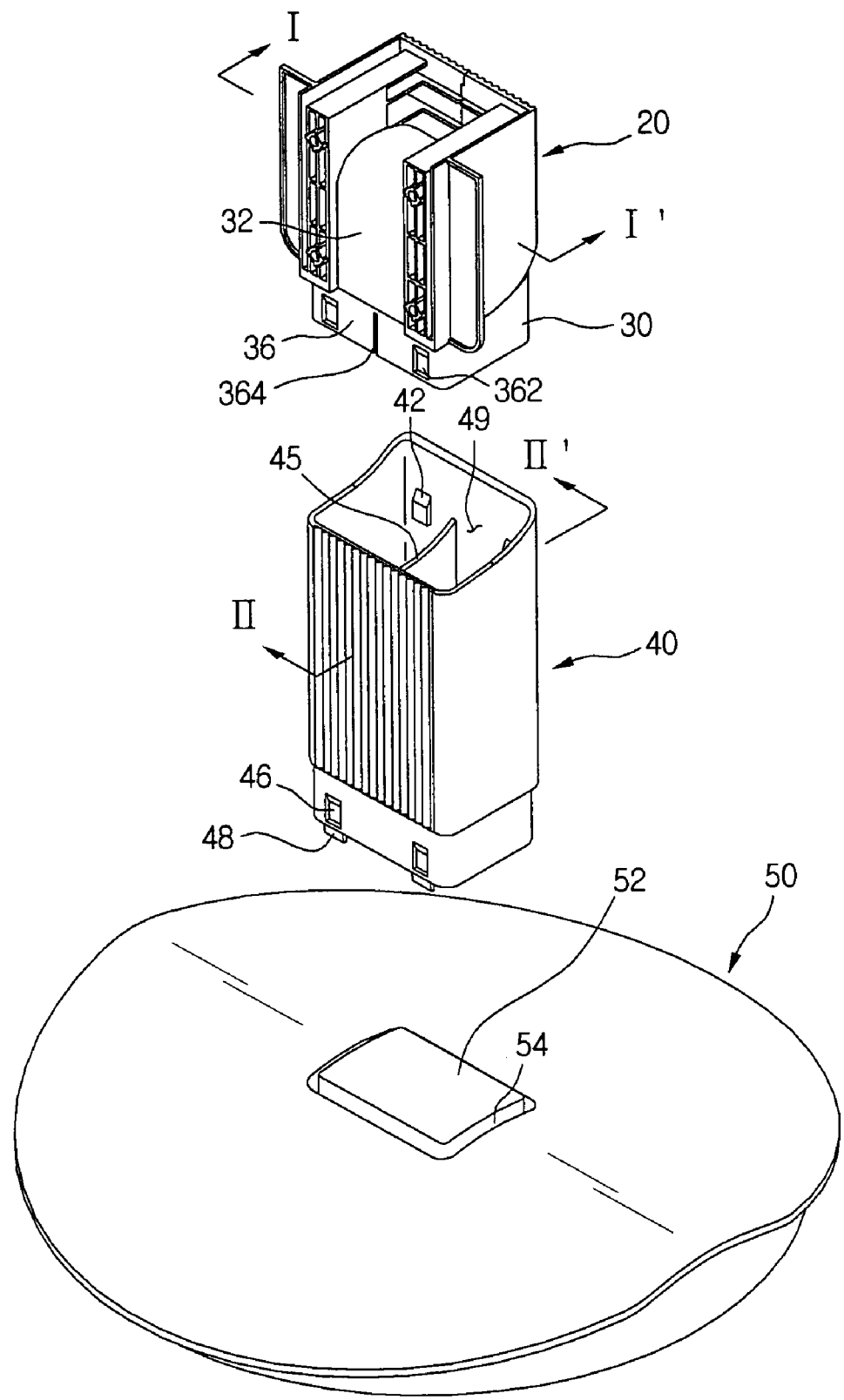
FIG. 2 shows an exploded perspective view of the stand of a display device of FIG. 1.

The stand (10), in a state where the parts are separated each other, is shown in FIG. 2, further there is shown a stand itself except the display device so as to simplify the FIG. 2.

FIG. 2 shows an explode perspective view of the stand of a display device.

Referring to FIG. 2, the hinge cover assembly 20 is pivotally connected to the hinge body 30 but securely fixed to the hinge body 30 so as not to be removed from the hinge body 30. However, the hinge body 30 is constituted to be separable from the hinge body supporting unit 40.

In detail, the hinge body 30 includes a hinge shaft cover 32 enclosing a hinge shaft about which the hinge cover 20 pivots and a hinge shaft supporting unit 36 for supporting the hinge shaft under the hinge shaft cover 32. Here, the hinge shaft supporting unit 36 is formed to be detachable to the hinge body supporting unit 40.

In detail, the hinge shaft supporting unit 36 has a rectangular section and is fixedly inserted into the hinge body supporting unit 40 through an opening 49 formed on a top of the hinge body supporting unit 40. That is, at least one hook groove 362 is formed on an outer surface of the hinge shaft supporting unit 36. In this embodiment, two rectangular hook grooves 362 are formed on front both sides of the hinge shaft supporting unit 36. Also, two rectangular hook grooves are formed on rear both sides of the hinge shaft supporting unit 36. The hinge shaft supporting unit 36 is not limited to the above case. That is, the hinge shaft supporting unit may be formed having a variety of sections. Also, the locations of the hook grooves 362 may vary.

Meanwhile, the hinge body supporting unit 40 formed in a hollow rectangular cylinder shape. Here, an inner circumference of the hollow portion of the hinge body supporting unit 40 is identical to an outer circumference of the hinge shaft supporting unit 36 so that the hinge shaft supporting unit 36 can be fitted in the hollow portion of the hinge body supporting unit 40.

As shown in FIG. 2, the hinge body supporting unit 40 is provided with hook projections 42 hooked with the hook grooves 362 when the hinge shaft supporting unit 36 is inserted into the hinge body supporting unit 40 through the opening 49. Therefore, when the hinge shaft supporting unit 36 is inserted into the hinge body supporting unit 40, it can be securely fixed in the hinge body supporting unit 40 by the interlock of the hook projections 42 and the hook grooves 362.

In order to guide the hinge shaft supporting unit 36 when the hinge shaft supporting unit 36 is fitted in the hinge body supporting unit 40, a guide groove 364 is formed along a center line of the hinge shaft supporting unit 36 and a guide rib 45 inserting in the guide groove 364 is formed on an inner surface of the hinge body supporting unit 40.

Hook grooves are formed on a lower portion of the hinge body supporting unit 40. Guide projections 48 are formed on a lower end of the hinge body supporting unit 40. The guide projections 48 extend downward below the hook grooves 46. The hook grooves 46 and the guide projections 48 of the hinge body supporting unit 40 are used for coupling the hinge body supporting unit 40 to the base unit 50.

The base unit 50 is provided with a seating groove 54 having a rectangular section corresponding to the lower end of the hinge body supporting unit 40. Hook projections (56 of FIG. 11) are formed in the seating groove 54. Guide holes (58 of FIG. 11) to which the guide projections 48 are engaged are formed on a bottom of the seating groove 54. Therefore, when the hinge body supporting unit 40 is fitted in the seating groove 54 of the base unit 50, the guide projections 48 are engaged with the guide grooves 11.

That is, the guide projections 48 formed on the lower end of the hinge body supporting unit 40 are fitted in the guide holes 58 of the bottom of the seating groove 54 and the hook grooves formed on the hinge body supporting unit are hooked with the hook projections 56 formed in the seating groove 54. Therefore, the hinge body supporting unit 40 can be securely coupled to the base unit 50.

The hinge body 30, the hinge body supporting unit 40 and the base unit 50 are separated formed and assembled with each other.

At this point, the hook grooves and hook projections for assembling the hinge body, the hinge body supporting unit and the base unit may alter in their locations. That is, the locations, shapes and number of the hook grooves and projections are not limited to the above description.

As described above, the hinge body is first fitted in the hinge body supporting unit and the lower end of the hinge body supporting unit is coupled to the seating groove of the base unit, thereby completing the assembling of them.

Since the hinge body, the hinge body supporting unit and the base unit are separable from each other, they can be packaged in a state where they are separated. Therefore, a package volume can be reduced, thereby reducing the distribution cost.

Hereunder, detailed explanations of each part constituting the stand are given, referring the drawings.

Figure 3:
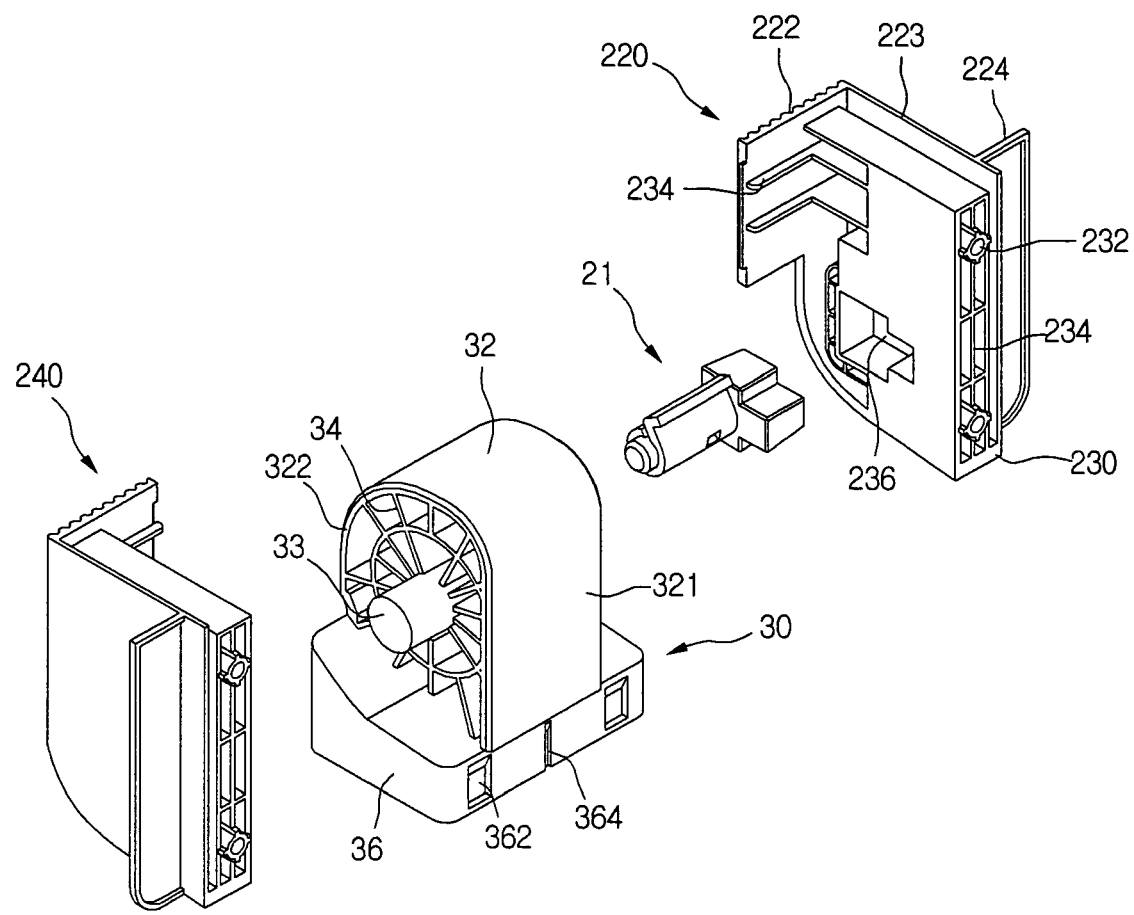
FIG. 3 is an exploded perspective view of a hinge cover assembly and a hinge body of the stand of a display device according to the embodiment of the present invention.

FIG. 3 is an exploded perspective view of the hinge cover assembly and the hinge body of the stand of a display device.

Referring to FIG. 3, the hinge cover assembly 20 is fixed on the rear surface 2 of the display device 1 and the hinge shaft assembly 21 is associated with the hinge cover assembly 20. The hinge shaft assembly 21 is fixed on the hinge body 30.

The hinge cover assembly 20 includes left and right hinge covers 220 and 240 coupled to left and right sides of the hinge body 30.

Figure 4:
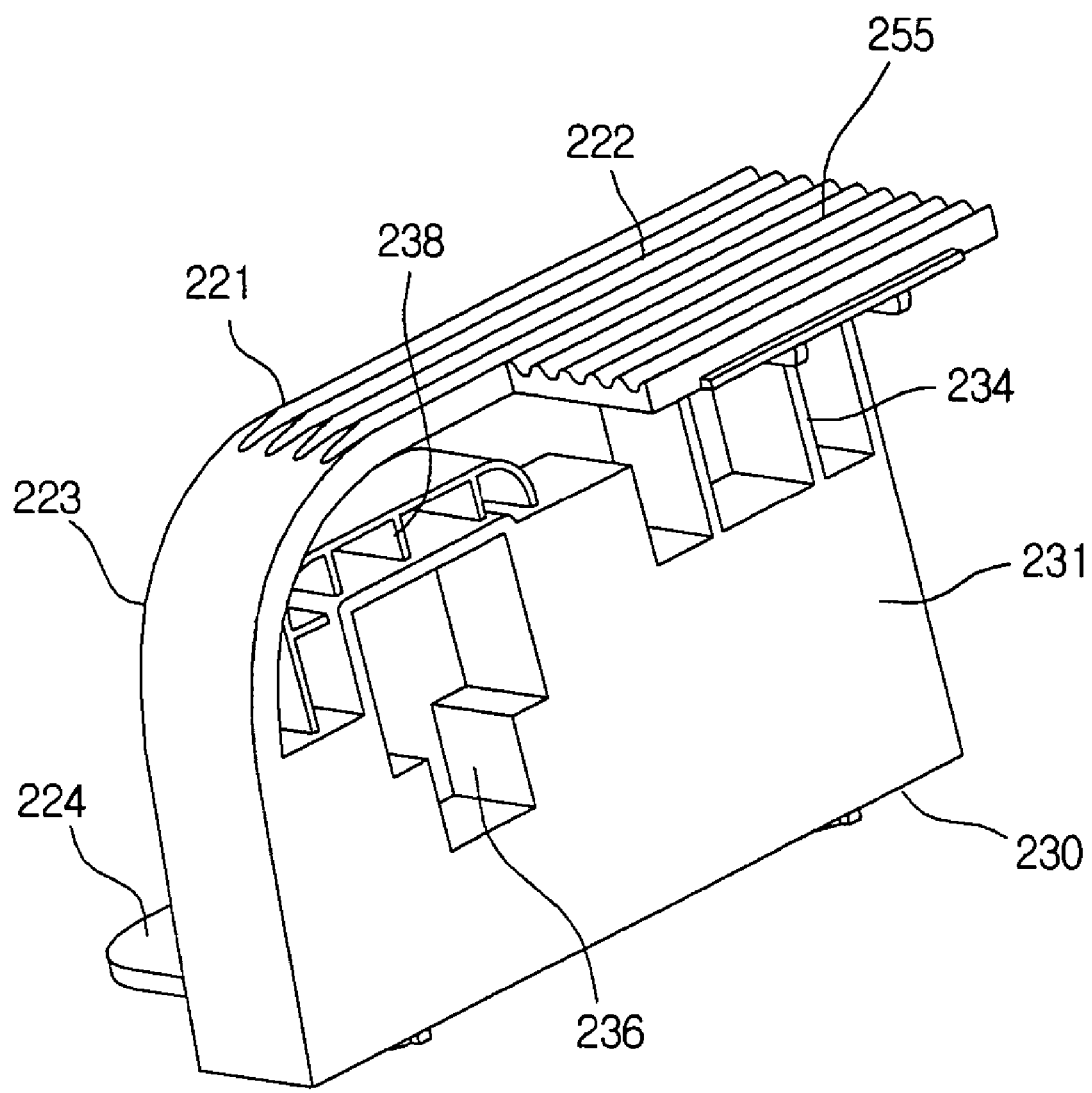
FIG. 4 is a perspective view of the right hinge cover depicted in FIG. 3.

FIG. 4 is a perspective view of the right hinge cover.

Referring to FIGS. 3 and 4, the right hinge cover 220 includes a rear fixing portion 230 fixed on the rear surface 2 of the display device 1 and a cover portion 221 enclosing the rear fixing portion 230.

The rear fixing portion 230 is formed in a roughly hexahedron shape and formed inside the right hinge cover 220. The rear fixing portion 230 is provided with a key bracket insertion hole 236 in which a key bracket 22, that will be described later, is received. The rear fixing portion 230 is provided at one or more coupling portions 232 formed in a hollow cylindrical shape. Although two coupling portions 232 are provided in this embodiment, the present invention is not limited to this. Projections (not shown) formed on the rear surface 2 of the display device 1 are coupled into the coupling portions 232. The projections may be integrally formed on the rear surface of the display device 1 or may be formed of screws screw-coupled to and projected from the rear surface of the display device 1. With this structure, the right hinge cover is coupled to the rear surface of the display device. However, the coupling structure of the right hinge cover is not limited to the above.

The rear fixing portion 230 is hollowed to reduce the material costs. At this point, in order to enhance the strength of the coupling portions 232 formed on the right hinge cover 220, a plurality of supporting ribs 234 are arranged around the coupling portions 232 in horizontal and vertical directions.

The supporting ribs 234 may be also formed around or on the hinge covers 220 and 240, the hinge body 30, and the base unit 50 as well as around the coupling portions 232, thereby enhancing the strength of the parts. This will be described in more detail later.

Referring again to FIGS. 3 and 4, the key bracket insertion groove 236 is T-shaped and formed on an inner-lower portion of the rear fixing portion 230.

The key bracket 22 is coupled to the key bracket insertion groove 236. Referring to FIG. 4, in order to securely support the key bracket 22 in the key bracket insertion groove 236, key bracket supporting ribs 238 are formed around the key bracket insertion groove 236.

A cover portion 221 is formed on an outer surface of the rear fixing portion 230. The cover portion 221 defines an outer surface of the right hinge cover 220. The cover portion 221 is exposed to the rear surface of the display device when the rear fixing unit 230 is fixed on the display device 1.

That is, the cover portion 221 includes a ]-shaped central cover section 222 placed inside the right hinge cover 220, a side cover section 223 extending from an outer edge of the central cover section 222 frontward at right angles, and an outer cover section 224 extending from the side cover section 223 outward at right angles.

A plurality of supporting ribs 234 for enhancing a strength of the central cover section 222 are formed on an inner surface of the center cover section 222. A plurality of vertical grooves 225 are preferably formed on an outer surface of the central cover section 222 in order to prevent the central cover section 222 from getting distorted.

The side cover section 223 is spaced apart from the rear fixing unit 230 by a predetermined distance. The outer cover section extending from the side cover section 223 contacts the rear surface of the display device.

In this embodiment, the cover portion 221 is integrally formed with the rear fixing unit 230 enclosing the hinge shaft. In the related art stand, since the hinge unit is formed of metal, there is a need for a separate cover. However, in the present invention, the hinge unit can be formed in a simple structure by using plastic.

The left and right hinge covers 240 and 220 are symmetrical with each other except for the inner surfaces between which the hinge shaft is inserted. Therefore, only the different portions from right hinge cover 220 will be described for the left hinge cover 240.

The left hinge cover 240 is provided at an inner surface with a circular groove (246 of FIG. 8) in which a circular fixing hinge shaft 33 formed on the hinge body 30 is inserted. This is to allow the hinge shaft 24 frictionally pivoting can be coupled to only the right hinge cover 220. Even when the hinge shaft 24 is formed on one of the left and right hinge covers 240 and 220, the display device 1 coupled to the hinge unit can frictionally pivot. This reduces the number of parts of the stand.

However, the hinge shaft assembly may be formed on both the left and right hinge covers 240 and 220. In this case, the right and left hinge covers 220 and 240 are exactly symmetrical with each other.

The hinge shaft assembly 21 coupled to the hinge body 30 and the right hinge cover 220 will be described in more detail with reference to the accompanying drawings.

Figure 5:
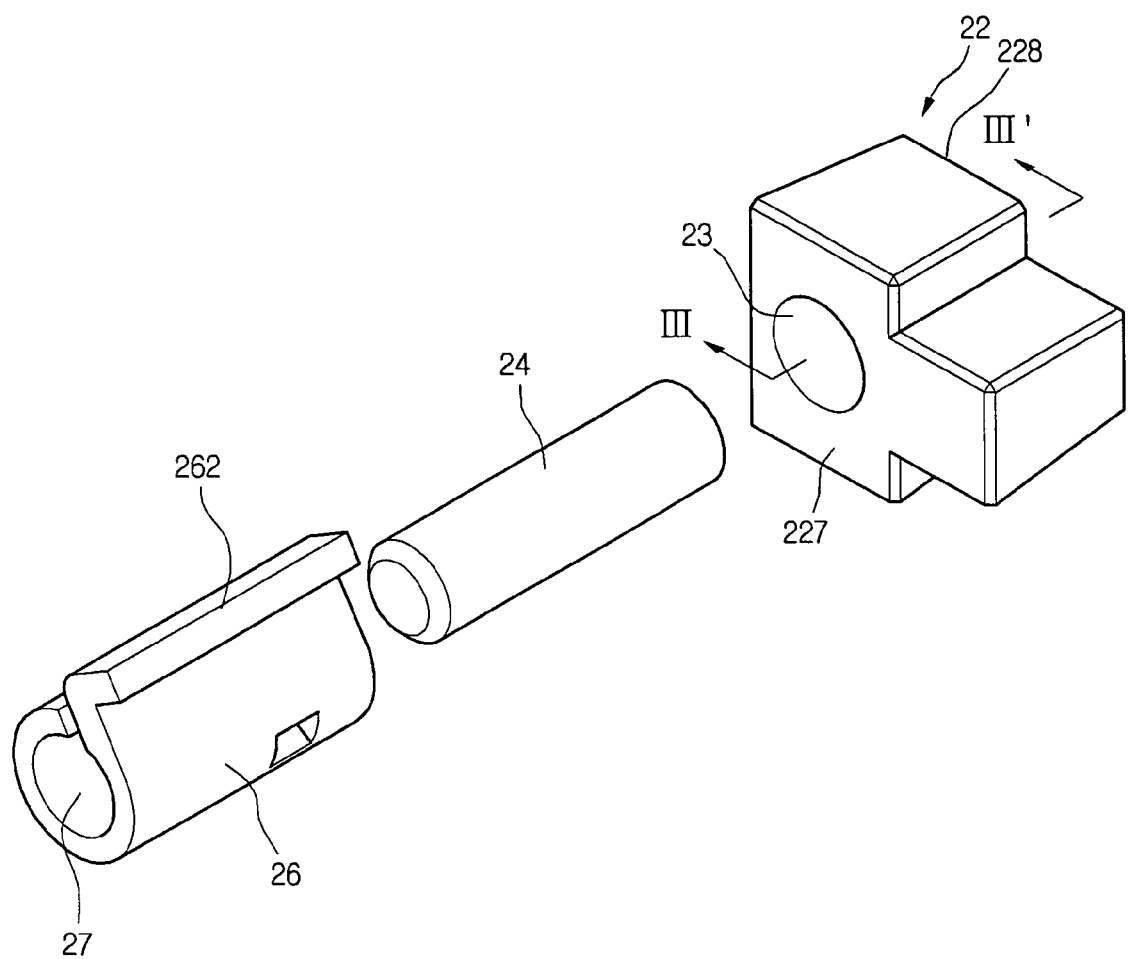
FIG. 5 is an exploded perspective view of a hinge shaft assembly depicted in FIG. 3.

FIG. 5 is an exploded perspective view of the hinge shaft assembly.

The hinge shaft assembly 21 further includes a hinge shaft 24 inserted into a hole 23 formed on a side surface of the key bracket 22 and frictional spring 26 coupled to outer circumferences of the hinge shaft 24. The key bracket 22 is formed in a T-shape. The key bracket 22 is preferably formed of metal. The key bracket 22 is provided at a center with the hole 23 in which the hinge shaft 24 is inserted. The hinge shaft 24 inserted in the hole 23 does not pivot relative to the hole 23. Therefore, when the hinge shaft 24 pivots, the key bracket 22 also pivots therewith. In order to obtain the movement, the hinge shaft 24 may be provided with a serration discontinuity surface or may be interference fitted in the hole 23.

Figure 6:
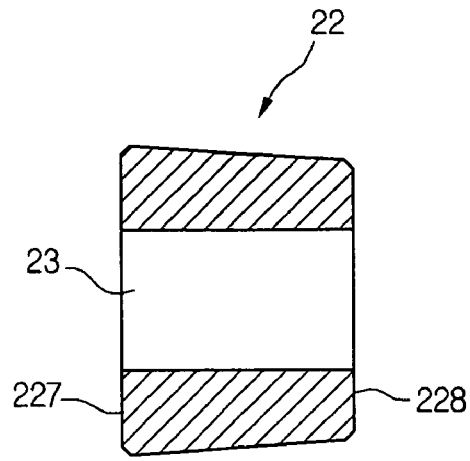
FIG. 6 is a sectional view taken along line III-III' of FIG. 5, illustrating the key bracket.

The key bracket 22 is formed having a trapezoidal cross section (see FIG. 6). That is, a surface area of an inner surface 228 of the key bracket 22, which faces an inner wall of the insertion hole 236 of the right hinge cover 220, is less than that of an outer surface 227 of the key bracket 22, which is exposed outward. Here, the surface area of the outer surface 227 of the key bracket 22 is preferably greater than an opening of the key bracket insertion hole 236.

With the above-described structure, the key bracket 22 formed of metal can be forcedly fitted in the key bracket insertion hole 236 of the right hinge cover 220 formed of a plastic material.

When the hinge shaft 24 is inserted in the key bracket 22, it is preferable that a half of the hinge shaft 24 protrudes out of the key bracket 22. The protruding portion of the hinge shaft 24 is inserted in a hole 27 of the frictional spring 26. As the key bracket 22 and the frictional spring 26 are fitted around the hinge shaft 24, the hinge shaft assembly 21 is completed.

As shown in FIG. 3, the key bracket 22 of the hinge shaft assembly 21 is fixed by being forcedly fitted in the key bracket insertion hole 236 formed on the inner surface of the right hinge cover 220, and the frictional spring 26 is fixed by being inserted in the frictional spring insertion hole 28 of the hinge body 30.

Figure 7:
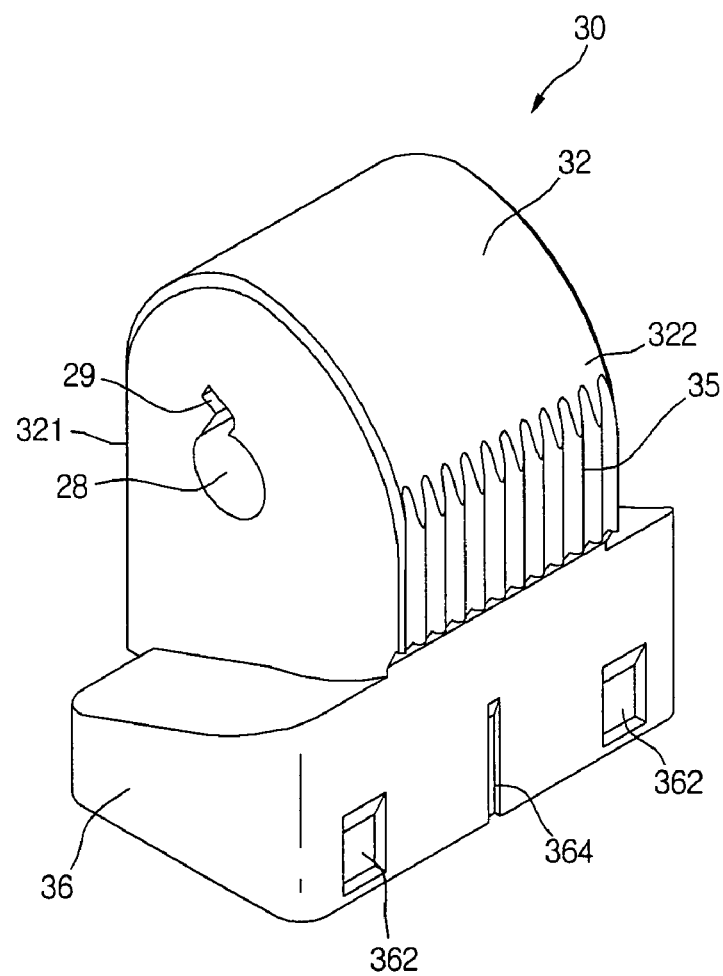
FIG. 7 is a perspective view of a hinge body depicted in FIG. 3.

FIG. 7 is a perspective view of the hinge body on which the hinge shaft assembly is fixed.

Referring to FIGS. 3 and 7, the hinge body 30 includes the hinge shaft cover 32 to which the right and left hinge covers 220 and 240 are coupled and a hinge shaft supporting unit 40 disposed under the hinge shaft cover 32 to fix the hinge shaft cover 32 to the hinge body supporting unit 40.

The hinge shaft cover 32 is provided at a center with a hinge shaft fitting groove 28 in which the frictional spring 26 is fitted and a fixing hinge shaft 33 formed in an opposite surface to the hinge shaft receiving groove 28.

As shown in FIG. 7, the hinge shaft receiving groove 28 is formed through a center of the right surface of the hinge shaft cover 32.

A ]-shaped groove 29 extends from the hinge shaft receiving groove 28. A ]-shaped projection 262 of the frictional spring 26 is fitted in the ]-shaped groove 29 to prevent the frictional spring 26 from rotating relative to the hinge body 30.

The fixing hinge shaft 33 is fitted in a groove (246 of FIG. 8) formed on an inner surface of the left hinge cover 240 to pivotally support the left hinge cover 240. Here, the fixing hinge shaft 33 is loosely coupled to the groove 246. That is, if the fixing hinge shaft 33 is strongly coupled to the left hinge cover 240, the fixing hinge shaft 33 may disturb the pivot of the hinge shaft 24 coupled to the right hinge cover 220.

Referring to FIG. 3, a plurality of supporting ribs 34 are formed on an outer circumference of the fixing hinge shaft 33 and extend in a radial direction.

As shown in FIGS. 3 and 7, the upper portion of the hinge shaft cover 32 is formed in a hemispherical shape.

The lower portion of the hinge shaft cover 32 is inclined such that a front surface 321 closer to the rear surface of the display device 1 further extends downward than an rear surface 322 so that the hinge cover can effectively pivot about the hinge body. A plurality of grooves 35 are vertically formed on the surface 322 of the hinge shaft cover 32 to prevent the hinge shaft from twisting. The hinge shaft supporting unit 36 has a flat lower surface such that a front side of the hinge shaft supporting unit 36 is longer than a rear side of the hinge shaft supporting unit 36.

Figure 8:
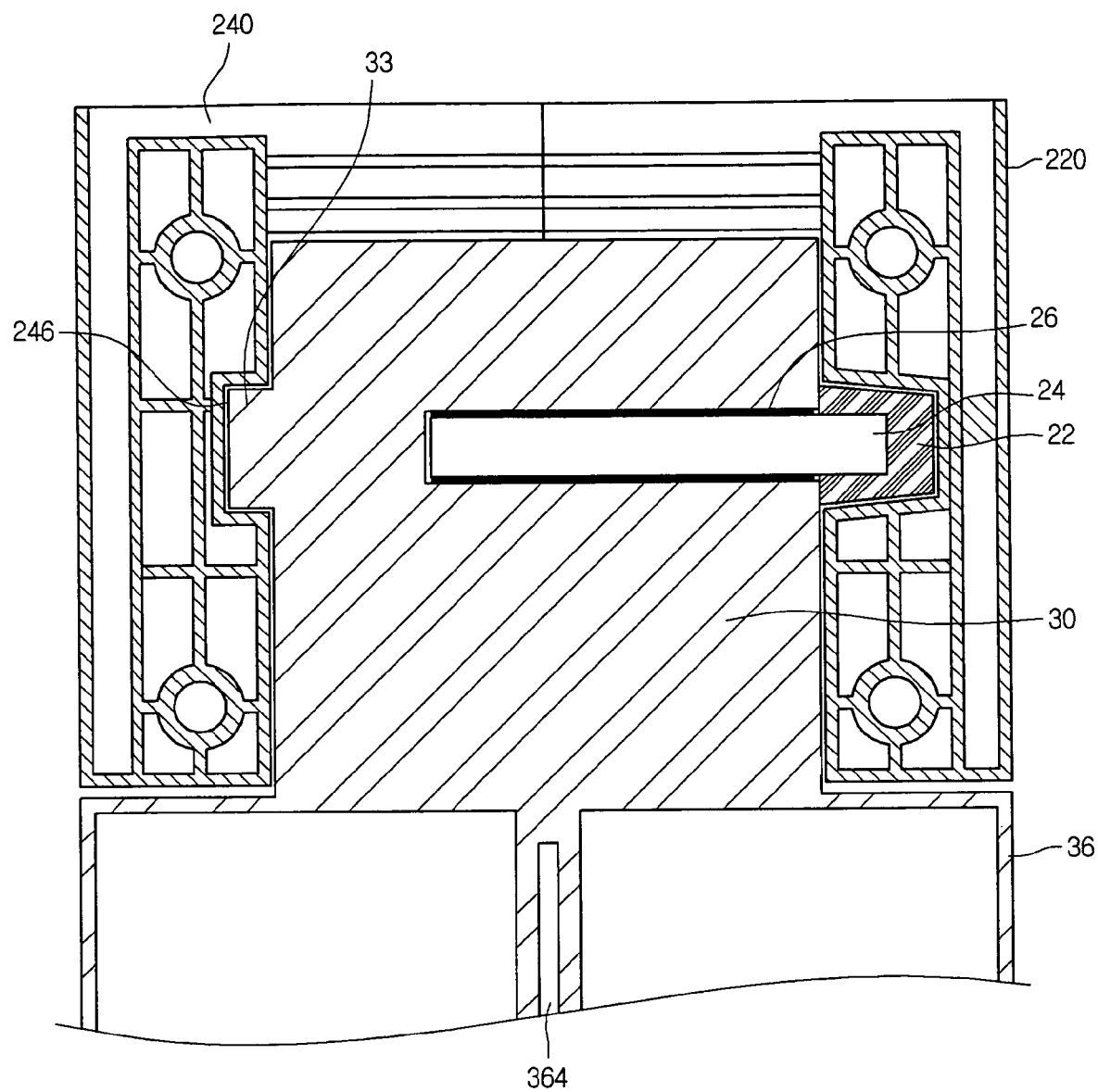
FIG. 8 is a sectional view taken along line I-I' of FIG. 2.

FIG. 8 is a sectional view taken along line I-I' of FIG. 2.

As shown in FIG. 8, the hinge shaft supporting unit 36 formed on the lower portion of the hinge body 30 is provided at a center portion with the guide groove 364 and hollowed. In order to enhance the strength of the hinge shaft supporting unit 36, one or more supporting ribs 36 may be formed on the inner surface of the hinge shaft supporting unit 36.

Figure 9:
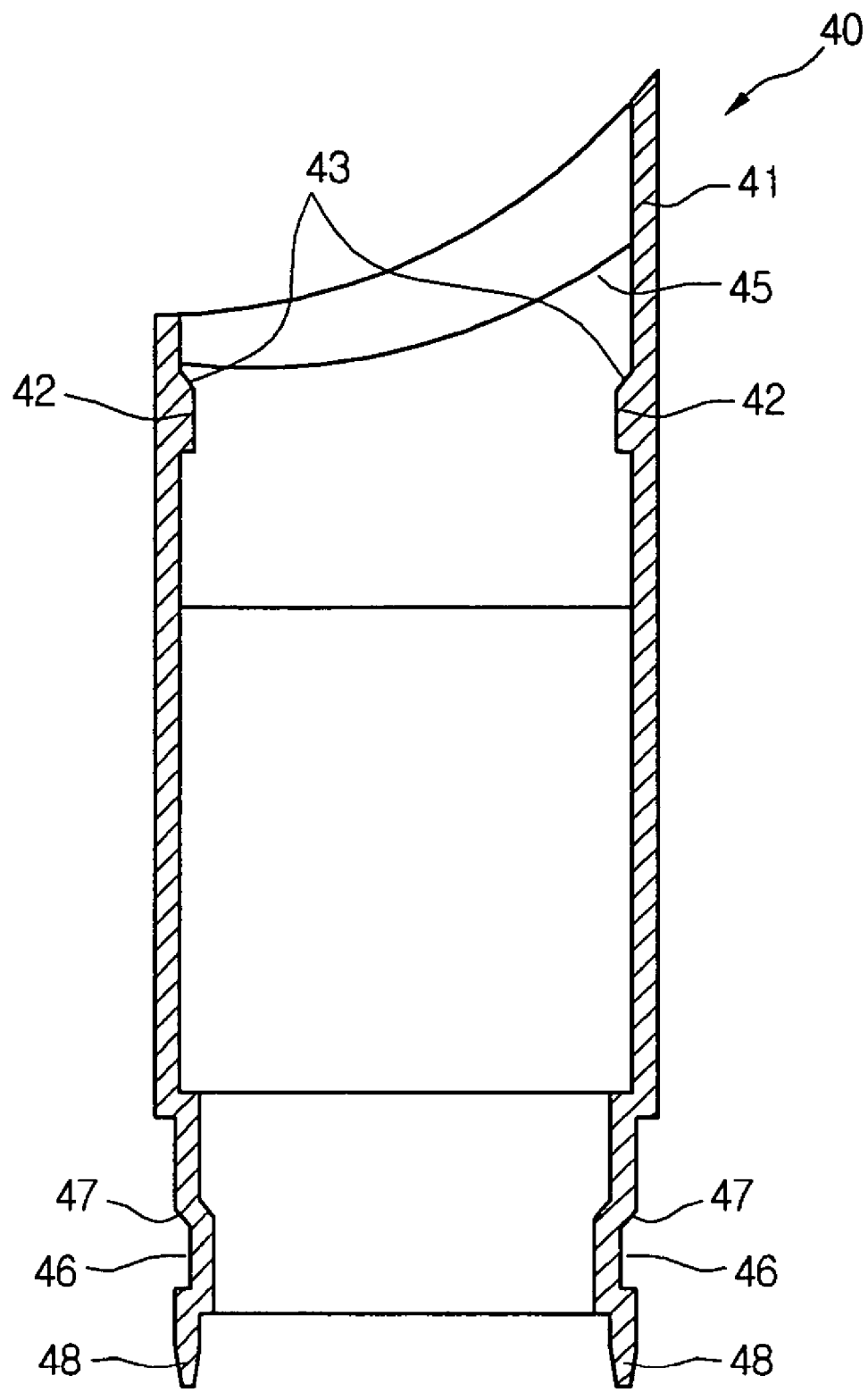
FIG. 9 is a sectional view taken along line II-II' of FIG. 2, illustrating the hinge shaft supporting unit.
Figure 10:
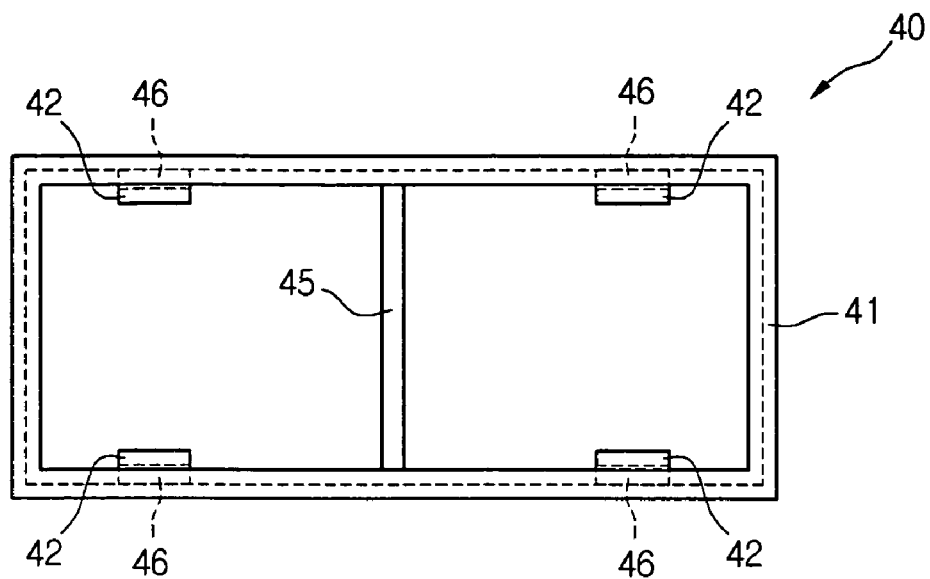
FIG. 10 is a top view of the hinge body supporting unit depicted in FIG. 2.

FIG. 9 is a sectional view taken along line II-II' of FIG. 2, illustrating the hinge shaft supporting unit, and FIG. 10 is a top view of the hinge body supporting unit.

Referring to FIG. 9 and FIG. 10, the hinge body supporting unit 40 is formed of a hollow rectangular pillar. As described above, the hook projections 42 are formed on the inner surface of the hinge body supporting unit 40 and the hook groove 46 is formed on a lower-outer surface of the hinge body supporting unit 40.

The hook projection 42 is provided at an upper portion with an inclined portion 43. The inclines portion 43 is for reducing frictional force when the hinge body 30 is inserted through the opening 49 into the hinge body supporting unit 40. The hook groove 46 is also provided with the inclined surface 47. The hook grooves 46 are indented from the outer surface of the hinge body 30. The inclined surface 47 of the hook groove 46 contacts the inclined portion of the hook projection formed on the base unit 50. The hinge body supporting unit 40 is provided at an upper-inner surface with a vertical guide rib 45 that can be inserted in a guide groove 364 of the hinge body 30. The guide rib 45 functions to guide the hinge body 30 into the hinge body supporting unit 40 and enhance the strength of the hinge body supporting unit 40.

In order to enhance the strength of the hinge body supporting unit, a plurality of supporting ribs (not shown) may be formed on the inner surface of the hinge body supporting unit.

Referring to FIGS. 2 and 9, the upper portion of the hinge body supporting unit 40 is provided with a stepped portion by which the upper and lower portions of the hinge body supporting unit 40 are divided. An inner width of the upper portion of the hinge body supporting unit 40 is greater than that of the lower portion of the hinge body supporting unit 40. Therefore, the lower portion of the hinge body supporting unit 40 can be securely engaged with the seating groove 54 of the base unit 50.

Figure 11:
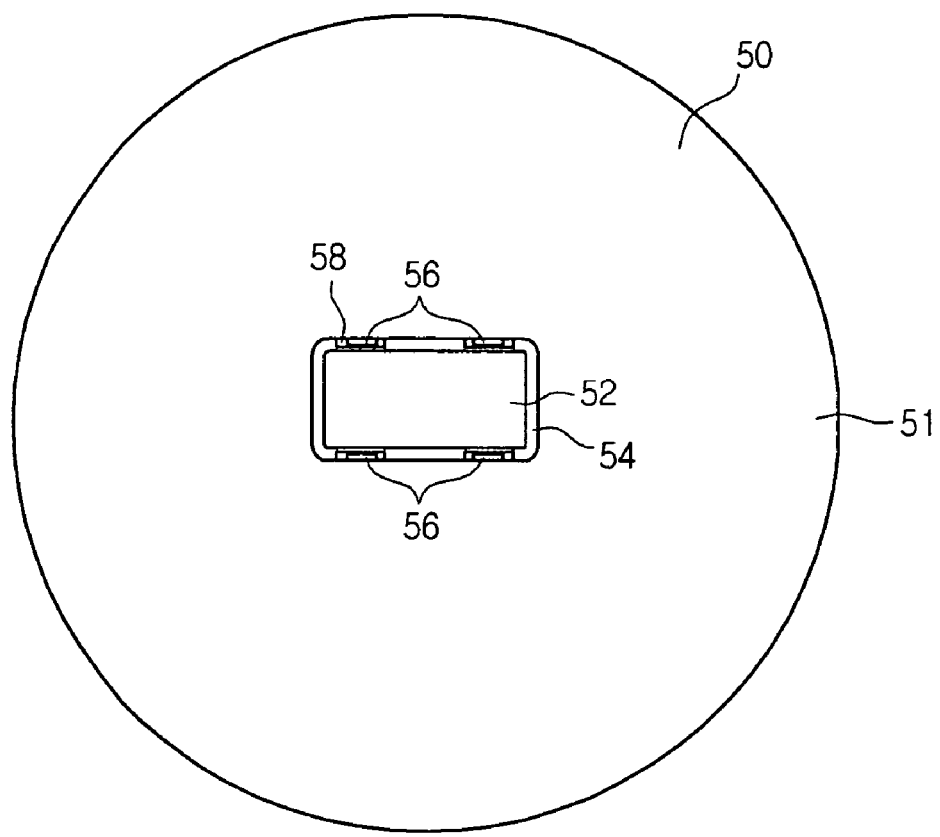
FIG. 11 is a top view of the base unit depicted in FIG. 2.
Figure 12:
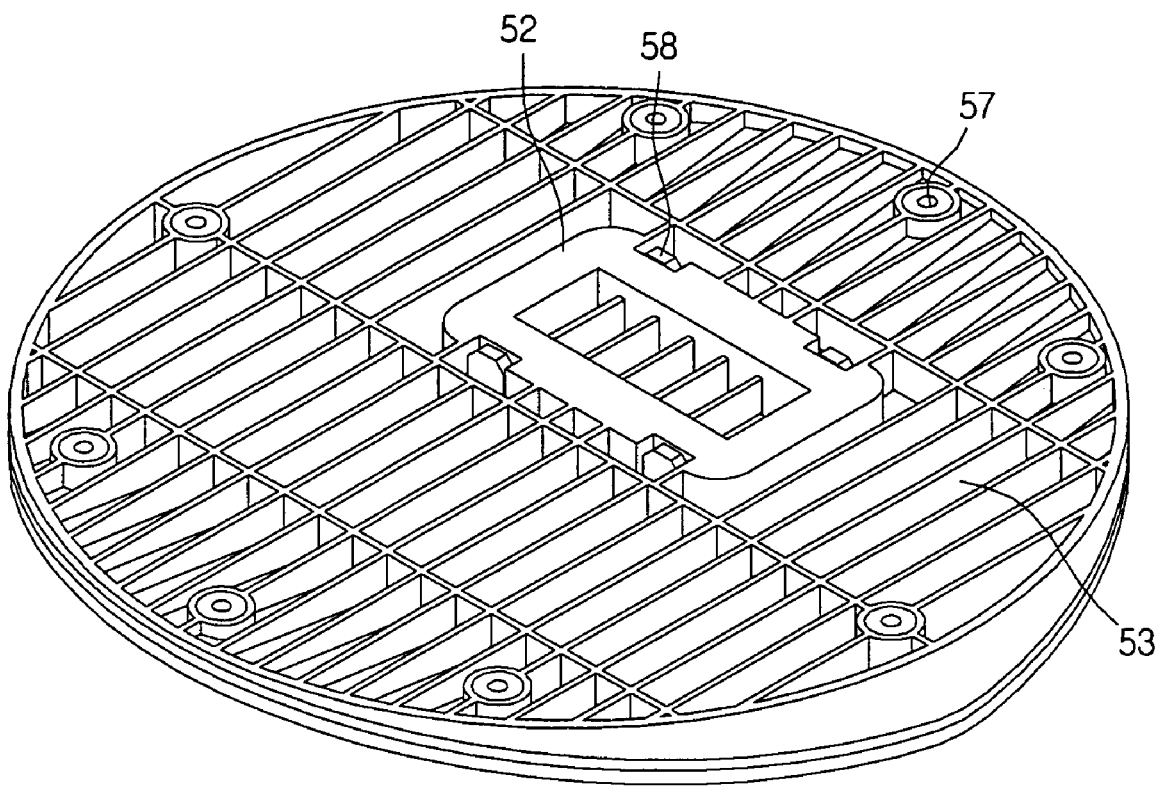
FIG. 12 is a bottom perspective view of the base unit depicted in FIG. 2.

FIG. 11 is a top view of the base unit and FIG. 12 is a bottom perspective view of the base unit.

Referring to FIGS. 11 and 12, a rectangular elevated portion 52 is formed on a center of the base 50. A width of the elevated portion 52 is identical to an inner width of the hinge body supporting unit 40.

The seating groove 54 is formed around the elevated portion 52. The seating groove 54 is provided with one or more hook projections 56 and guide holes 58 are formed under the hook projections 56. A shape of each of the hook projections 42 is identical to that of the hook projection 56.

The lower portion of the hinge body supporting unit 40 is coupled to the base unit 50. At this point, the elevated portion 52 is inserted into the base body supporting unit 40 through a bottom opening of the hinge body supporting unit 40. In addition, as described above, the hook projections 56 of the base unit 50 are hooked on the hook grooves 46 formed on the lower portion of the hinge body supporting unit 40. As a result, the hinge body supporting unit 40 is securely coupled to the base unit 50.

A plurality of supporting ribs 53 are formed on a bottom surface of the base unit 50 to enhance the strength of the base unit 50. As shown in FIG. 12, the supporting ribs 53 are composed of first ribs arranged in parallel to each other and second ribs arranged in parallel to each other and crossing the first ribs at right angles.

In order to increase frictional force between the bottom of the base unit 50 and the horizontal surface, one or more frictional members 57 formed of, for example, rubber, are provided on the bottom of the base unit 50.

According to the present invention, since the hinge cover, the hinge body, the hinge body supporting unit, and the base unit can be assembled without using any separated fastening member such as screws, the assembling process can be simplified.

The hinge body supporting unit and the base unit can be easily disassembled from the hinge body fixed on the rear surface of the display device.

Therefore, the parts of the stand can be independently separated, the packaging volume can be reduced. Furthermore, the separated parts can be easily assembled.

Since the hinge unit of the stand is composed of only three parts such as the hinge cover, the hinge shaft assembly and the hinge body, the manufacturing cost can be reduced.

Since the hinge cover exposed out of the rear surface is coupled to the hinge shaft, there is no need to provide a cover portion enclosing the hinge portion, thereby reducing the number of parts.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stand of a display device comprising:
 a hinge assembly to which a display device is pivotally coupled;
 a hinge body supporting unit having one side to which the hinge assembly is detachably coupled; and
 a base unit detachably coupled to the hinge body supporting unit to support the display device on a supporting surface, wherein the base comprises a seating groove for engaging the hinge body supporting unit and one of the hinge assembly or the hinge body supporting unit is provided with a groove and the other of the hinge assembly or the hinge body support unit is provided with a projection, the projection being interlocked with the groove when the hinge assembly is coupled to the hinge body support unit, and
 wherein one of the hinge body supporting unit or the base unit is provided with a groove and the other of the hinge body support unit or the base unit is provided with a projection, the projection being interlocked with the groove when the hinge body supporting unit is coupled to the base unit.

2. The stand of a display device according to claim 1, wherein the hinge assembly comprises:
 a hinge cover assembly coupled to the display device;
 a hinge shaft having a first side fitted in the hinge cover assembly; and
 a hinge body having a hinge shaft receiving portion in which a second side of the hinge shaft is inserted.

3. The stand of a display device according to claim 2, wherein the hinge cover assembly includes first and second covers and the hinge body is disposed between the first and second covers.

4. The stand of a display device according to claim 2, further comprising a key bracket for preventing the hinge shaft inserted in the hinge cover assembly from rotating relative to the hinge cover assembly.

5. The stand of a display device according to claim 2, further comprising a frictional spring interposed between the second side of the hinge shaft and the hinge body.

6. The stand of a display device according to claim 2, wherein the hinge cover assembly includes first and second covers and the hinge shaft is inserted in one of the first and second covers.

7. The stand of a display device according to claim 2, wherein at least one of the hinge cover assembly and the hinge body is formed of a plastic material.

8. The stand of a display device according to claim 1, wherein the hinge assembly is fitted in and surface-contacts the hinge body supporting unit.

9. The stand of a display device according to claim 8, wherein the hinge assembly is partly inserted in the hinge body supporting unit.

10. The stand of a display device according to claim 1, wherein the coupling of the hinge body supporting unit and the base unit is realized by fitting the hinge body supporting unit to the base unit.

11. The stand of a display device according to claim 1, wherein at least one of the hinge body supporting unit, the base unit and the hinge assembly is formed of a plastic material.

12. A stand of a display device comprising:
 a hinge cover assembly coupled to a display device;
 a hinge shaft having a first side fixed to the hinge cover assembly;
 a hinge body having a hinge shaft receiving portion in which a second side of the hinge shaft is inserted;
 a hinge body supporting unit comprising an opening formed in one side of the hinge body, in which the hinge body is detachably fitted;
 a base unit in which the hinge body supporting unit is detachably coupled,
 a first upper connecting portion formed at one of a lower portion of the hinge body or an upper portion of the hinge body supporting unit;
 a second upper connecting portion formed at one of the other of the lower portion of the hinge body or the upper portion of the hinge body supporting unit;
 a first lower connecting member formed on one of the hinge body supporting unit or the base unit; and
 a second lower connecting member formed on the other of the hinge body supporting unit or the base unit, wherein:
 the second upper connecting portion is aligned with the first upper connecting portion to fix a relative location of the hinge body and the hinge body supporting unit, and
 the second lower connecting portion is aligned with the first lower connecting member to fix a relative location between the hinge body supporting unit and the base unit, and
 the base comprises a seating groove for engaging the other side of the hinge body supporting unit.

13. A stand of a display device comprising:
 a hinge cover assembly coupled to a rear surface of a display device;
 a metal hinge shaft having a first portion supported on the hinge cover assembly;
 a hinge body on which a second side of the metal hinge shaft is supported;
 a hinge body supporting unit to which a lower portion of the hinge body is detachably coupled for selectively performing a first separation between the hinge body and the hinge body supporting unit; and
 a base unit disposed on a supporting surface and detachably coupled to the hinge body supporting unit to support the display device against the supporting surface for selectively performing a second separation between the base unit and the hinge body supporting unit,
 wherein at least one of the hinge cover, the hinge body, the hinge body supporting unit, and the base unit is formed of a plastic material, and an upper portion of the hinge body supporting unit is fitted to the lower portion of the hinge body, and a lower portion of the hinge body supporting unit is fitted to a seating groove formed in the base.

14. The stand of a display device according to claim 13, wherein the hinge cover assembly and the hinge body are provided with a plurality of grooves enhancing the strength thereof.

15. The stand of a display device according to claim 13, wherein one of a surface of the hinge body and a surface of the hinge cover assembly is exposed to an external side.

16. The stand of a display device according to claim 13, wherein a metal hinge shaft receiving portion of the hinge cover assembly is provided with a plurality of supporting ribs.

17. The stand of a display device according to claim 4, wherein the key bracket is coupled to an insertion hole formed in the hinge cover, and a surface area of an inner surface of the key bracket, which faces an inner wall of the insertion hole, is less than that of an outer surface of the key bracket, which is exposed outward, and the surface area of the outer surface of the key bracket is larger than a surface area of the insertion hole.

* * * * *